H. P. DAVIS.
OVERHEAD LINE MATERIAL FOR ELECTRICAL RAILWAYS.
APPLICATION FILED NOV. 8, 1907.
933,747.
Patented Sept. 14, 1909.
2 SHEETS—SHEET 1.
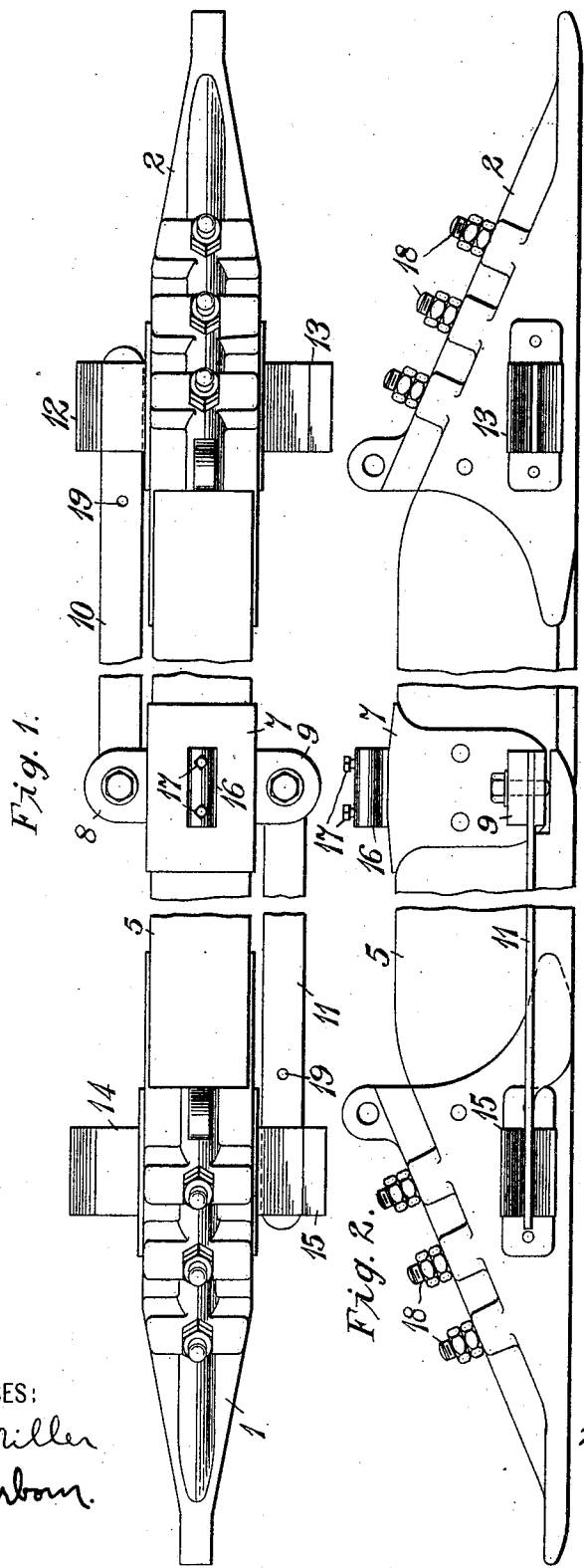
WITNESSES:
Fred H. Miller
R. J. Dearborn.
INVENTOR
Harry P. Davis
BY
Asley G. Carr
ATTORNEY H. P. DAVIS.
OVERHEAD LINE MATERIAL FOR ELECTRICAL RAILWAYS.
APPLICATION FILED NOV. 8, 1907.
933,747.
Patented Sept. 14, 1909.
2 SHEETS—SHEET 2.
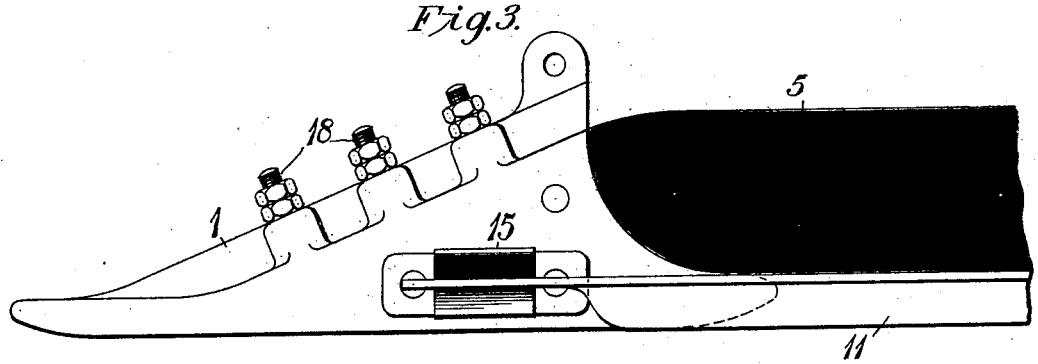
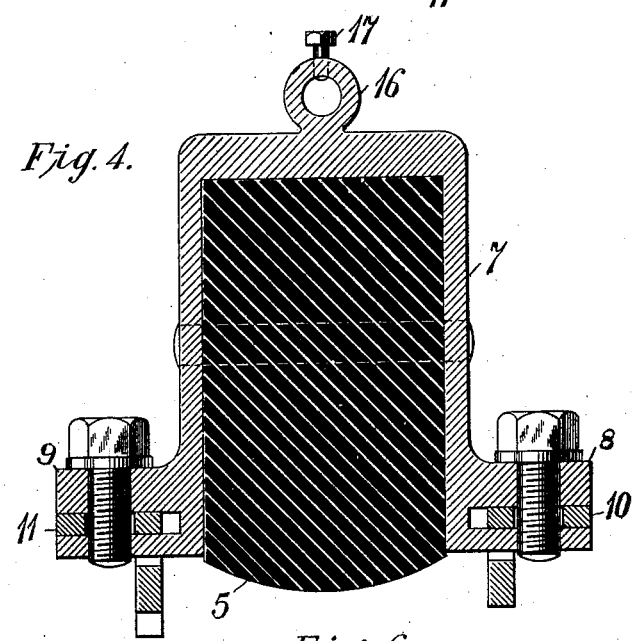
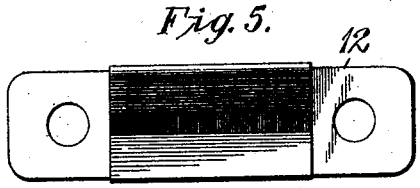
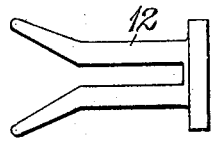
WITNESSES:
Fred H. Miller
R. J. Dearborn.
INVENTOR
Harry P. Davis
BY
Wesley G. Carr
ATTORNEY

UNITED STATES PATENT OFFICE.

HARRY P. DAVIS, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

OVERHEAD-LINE MATERIAL FOR ELECTRICAL RAILWAYS.

933,747.  Specification of Letters Patent.  Patented Sept. 14, 1909.

Application filed November 8, 1907. Serial No. 401,274.

*To all whom it may concern:*

Be it known that I, HARRY P. DAVIS, a citizen of the United States, and a resident of Pittsburg, in the county of Allegheny and State of Pennsylvania, have invented a new and useful Improvement in Overhead-Line Material for Electrical Railways, of which the following is a specification.

My invention relates to electric trolley line construction and it has for its object to provide a section-break insulator for such construction that shall be simple and durable and adapted for use in connection with high speed sliding or bow trolleys and that shall embody suitable switching devices for normally bridging the insulating parts.

In the construction of trolley lines for electric railways it is often desirable to divide the line into a series of sections which are insulated from each other and which may be connected through suitable switching devices, under normal operating conditions. An arrangement of this kind is specially advantageous when the trolley line voltage is relatively high and, in order to successfully divide the line as above indicated, a section-break insulator must be provided which is capable of withstanding the mechanical tension in the line and is also capable of resisting the electrical strain imposed by the electromotive force of the line.

The section-break insulator of my present invention is specially constructed in view of the aforesaid requirements, and is so arranged that a sliding or bow trolley may pass over it without becoming electrically disconnected from the supply line, switching devices being also so embodied in it as to avoid the necessity of complex and expensive circuit interrupters such as are usually connected in circuits which shunt a section-break.

Figure 1, of the accompanying drawings, is a plan view and Fig. 2 is a side elevation of a section-break insulator and switching device arranged in accordance with my invention, and Figs. 3, 4, 5, and 6 are detail views, on a larger scale, of the device shown in Figs. 1 and 2.

Referring to the drawings, the device here illustrated comprises a pair of similar clamping end members 1 and 2 to which the extremities of trolley conductors (not shown) are connected and a body bar 5 to which the clamping end members are secured. The body bar 5 is of insulating material and is provided with, and is stiffened by, a center casting 7 which is shown in cross section in Fig. 4. The casting 7 is provided with bifurcated ear projections 8 and 9 to which the switch blades 10 and 11 are pivotally secured and the clamping end members 2 are provided with switch jaws 12, 13, 14, and 15, which are illustrated in detail in Figs. 5 and 6, and which are adapted to receive the outer ends of the switch blades 10 and 11. The outer extremities of the switch jaws diverge, as shown in Fig. 6, so that the switch arms or blades may be guided into place in closing the switches.

The switch blades are preferably of angle-section, the portions which are in the planes of the switch jaws being longer than the portions which lie in the planes at right angles thereto. As illustrated, the shorter portions of the blades have rounded ends as indicated at 3 in order that the sliding or bow trolley contact shoe may pass smoothly from the extremities of the trolley conductors onto the blades. The lower surface of the body bar 5 is rounded laterally so that it may be engaged by the trolley contact shoe when the switches are open.

The center casting illustrated in Fig. 4, is provided with a sleeve projection 16 having a set screw 17 by which a feeder conductor may be clamped to the casting. This casting may preferably be made of brass or other material which is a relatively good conductor of electricity.

The ends of the trolley line conductors are secured to the end clamping members by a plurality of bolts 18, substantially as illustrated and described in a co-pending application for "Section-break insulators" filed June 4, 1906, and bearing Serial No. 320,138.

The switch blades 10 are provided with holes 19 near their free ends to receive a hook which may be mounted upon one end of a pole and manipulated by an attendant to open and close the switches.

When the switches are both thrown in the same direction, the feeder circuit is connected to only one of the sections of the trolley and when they are closed in opposite directions both sections are supplied from the feeder circuit. When the blades are allowed to project laterally outward from the center casting, both sections are cut off from the feeder conductor.

The device illustrated may obviously be mounted in a vertical as well as in a horizontal plane and it is conceivable that various modifications in the size and arrangement of parts may be effected within the scope of my invention.

I claim as my invention:

1. A section-break device for trolley conductors comprising an insulating bar, end brackets or clamping members, an intermediate member of conducting material, and a plurality of switch blades independently supported by the intermediate member.

2. A section-break device for trolley conductors comprising end clamping members to which the extremities of trolley conductors are secured, a body bar of insulating material connecting the end members, an intermediate member of conducting material, and switch blades pivotally mounted on the intermediate member and adapted to electrically connect either one or both of the end members to the intermediate members.

3. A section-break device for trolley conductors comprising a non-conducting bar having end clamps of conducting material to which the extremities of an interrupted trolley conductor are secured, an intermediate member of conducting material having a sleeve projection and ear projections, and switch blades pivotally secured to the ear projections and adapted to connect either one or both of the end members to the intermediate member.

4. A section break device for trolley conductors comprising an insulating bar having end brackets provided with wire-clamping devices and switch jaws, an intermediate member and switch blades pivotally mounted thereon and respectively adapted to engage the switch jaws on either end bracket.

5. In a section break device, the combination with an insulating bar having conducting brackets provided with wire-clamping devices and side switch contact terminals and an intermediate conducting member, of a pair of switch members supported by said intermediate member and respectively adapted to make engagement with a contact terminal on either bracket.

In testimony whereof, I have hereunto subscribed my name this 28th day of Oct., 1907.

HARRY P. DAVIS.

Witnesses:
 CAROLINE E. SMYERS,
 BIRNEY HINES.